United States Patent
Sun et al.

(10) Patent No.: US 12,411,269 B2
(45) Date of Patent: Sep. 9, 2025

(54) MAGNETIC PIGMENT FLAKE, OPTICALLY VARIABLE INK, AND ANTI-FALSIFICATION ARTICLE

(71) Applicant: HUIZHOU FORYOU OPTICAL TECHNOLOGY CO., LTD., Huizhou (CN)

(72) Inventors: Hongbao Sun, Huizhou (CN); Qianyun Sun, Huizhou (CN); Zhangrong Chen, Huizhou (CN); Shuo Pan, Huizhou (CN)

(73) Assignee: HUIZHOU FORYOU OPTICAL TECHNOLOGY CO., LTD., Huizhou (CN)

( * ) Notice: Subject to any disclaimer, the term of this patent is extended or adjusted under 35 U.S.C. 154(b) by 160 days.

(21) Appl. No.: 17/853,944

(22) Filed: Jun. 30, 2022

(65) Prior Publication Data

US 2022/0334295 A1    Oct. 20, 2022

Related U.S. Application Data (63) Continuation of application No. PCT/CN2021/103887, filed on Jun. 30, 2021.

(30) Foreign Application Priority Data

Feb. 24, 2021   (CN) .......................... 202110210021.6

(51) Int. Cl.
*G02B 5/00* (2006.01)
*B42D 25/369* (2014.01)
(Continued)

(52) U.S. Cl.
CPC ......... *G02B 5/0242* (2013.01); *B42D 25/369* (2014.10); *B42D 25/378* (2014.10);
(Continued)

(58) Field of Classification Search
CPC ................... B32D 25/369–378; G02B 5/0242
See application file for complete search history.

(56) References Cited

U.S. PATENT DOCUMENTS

| | | |
|---|---|---|
| 2003/0031870 A1 | 2/2003 | Argoitia et al. |
| 2003/0170471 A1 | 9/2003 | Seto et al. |
| | (Continued) | |

FOREIGN PATENT DOCUMENTS

| | | |
|---|---|---|
| CN | 1459034 A | 11/2003 |
| CN | 1854204 A | 11/2006 |
| | (Continued) | |

OTHER PUBLICATIONS

Machine translation KR20130071191A (Year: 2023).*
(Continued)

*Primary Examiner* — Alexandre F Ferre (57) ABSTRACT

A magnetic pigment flake includes a filtering film layer, with magnetic or magnetizable material, and a metal nanoparticles layer, formed on a surface of the filtering film layer. The metal nanoparticles layer is configured to generate scattered light enhanced by a local surface plasmon resonance under an irradiation of visible light exceeding a predetermined intensity. An optically variable ink includes an ink body and the above-mentioned magnetic pigment flakes. An anti-falsification article includes an article body and the above-mentioned optically variable ink. The magnetic pigment flake of the optically variable ink is magnetically oriented, such that a bright and dark areas are generated with a viewing angel changing under an irradiation of visible light below the predetermined intensity. Under an irradiation of visible light exceeding the predetermined intensity, light with a color different from that of the bright area is generated on a corresponding position of the dark area.

19 Claims, 5 Drawing Sheets

(51) Int. Cl.
| | |
|---|---|
| B42D 25/378 | (2014.01) |
| C09C 1/00 | (2006.01) |
| C09D 11/037 | (2014.01) |
| C09D 11/50 | (2014.01) |
| G02B 5/02 | (2006.01) |
| G02B 5/22 | (2006.01) |
| G02B 5/28 | (2006.01) |

(52) U.S. Cl.
CPC .......... *C09C 1/0015* (2013.01); *C09D 11/037* (2013.01); *C09D 11/50* (2013.01); *G02B 5/008* (2013.01); *G02B 5/0284* (2013.01); *G02B 5/22* (2013.01); *G02B 5/28* (2013.01); *C01P 2004/20* (2013.01); *C01P 2004/80* (2013.01); *C01P 2006/42* (2013.01); *G02B 2207/101* (2013.01)

(56) References Cited

U.S. PATENT DOCUMENTS

| | | | |
|---|---|---|---|
| 2008/0318012 A1* | 12/2008 | Domnick | C09D 17/00 |
| | | | 427/205 |
| 2010/0307705 A1 | 12/2010 | Rahm et al. | |
| 2016/0152834 A1 | 6/2016 | Yoshinaga | |
| 2017/0023714 A1* | 1/2017 | Markantes | G02B 5/003 |
| 2017/0368798 A1 | 12/2017 | Seydel et al. | |
| 2018/0239070 A1* | 8/2018 | England | B44F 1/066 |
| 2020/0283637 A1 | 9/2020 | Book et al. | |
| 2020/0284947 A1 | 9/2020 | Argoitia et al. | |
| 2021/0231849 A1 | 7/2021 | Argoitia et al. | |
| 2021/0311235 A1 | 10/2021 | Argoitia et al. | |
| 2021/0311237 A1 | 10/2021 | Argoitia et al. | |

FOREIGN PATENT DOCUMENTS

| | | | | |
|---|---|---|---|---|
| CN | 1923912 A | | 3/2007 | |
| CN | 101706595 A | | 5/2010 | |
| CN | 102372944 A | | 3/2012 | |
| CN | 102971154 A | | 3/2013 | |
| CN | 103804963 B | * | 9/2015 | |
| CN | 108466504 A | | 8/2018 | |
| CN | 109608940 A | | 4/2019 | |
| CN | 110193976 A | | 9/2019 | |
| CN | 110667019 A | | 1/2020 | |
| EP | 1239307 A1 | * | 9/2002 | .......... C09C 1/0015 |
| EP | 1760118 A2 | | 3/2007 | |
| KR | 20130071191 A | * | 6/2013 | |

OTHER PUBLICATIONS

Translation of CN 103804963 (Year: 2024).*
International Search Report issued in corresponding International application No. PCT/CN2021/103887, mailed Nov. 24, 2021.
Written Opinion of the International Searching Authority for No. PCT/CN2021/103887.
European Search Report, European Application No. 21918115.3, mailed Jun. 28, 2023 (9 pages).
Chinese first office action, Application No. 202110210021.6, mailed Oct. 17, 2022 (16 pages).
European First Examination Report, European Application No. 21918115.3, mailed Jul. 23, 2025 (6 pages).

* cited by examiner

MAGNETIC PIGMENT FLAKE, OPTICALLY VARIABLE INK, AND ANTI-FALSIFICATION ARTICLE

CROSS REFERENCE TO RELATED APPLICATIONS

The present application is a continuation of International Patent Application No. PCT/CN2021/103887, filed Jun. 30, 2021, which claims priority to Chinese Patent Application No. 202110210021.6, filed Feb. 24, 2021, the entire disclosures of which are incorporated herein by reference.

TECHNICAL FIELD

The present disclosure relates to the field of a magnetic orientation, and in particular to a magnetic pigment flake, an optically variable ink, and an anti-falsification article.

BACKGROUND

Based on a principle of an optical thin film interference, a color of an optically variable film changes at different viewing angles. Due to a unique flip-flap property of the optically variable film, and a bright color changes obviously, the optically variable film cannot be scanned and copied, and is easily recognized by the public. The optically variable film has been widely used in an anti-falsification field of banknotes, securities and cigarette packets. With an optically variable anti-falsification technology, a circulation of counterfeit articles in the market is effectively reduced, and development of a falsification technology is curbed, thus it played an important role in maintaining the stability of market economy and information security. However, structures, action mechanisms and technological processes of magnetic optically variable pigments have been reported by a large number of patents and academic papers. At the same time, the magnetic optically variable pigment has also been applied in the decoration market, such that a credibility and anti-falsification performance as a high-security document protection are gradually decreasing.

SUMMARY OF THE DISCLOSURE

According to a first aspect of the present disclosure, a magnetic pigment flake is provided and includes: a filtering film layer, with a magnetic or magnetizable material; and a metal nanoparticles layer, formed on a surface of the filtering film layer. The metal nanoparticles layer is configured to generate scattered light enhanced by a local surface plasmon resonance under an irradiation of visible light exceeding a predetermined intensity.

According to a second aspect of the present disclosure, an optically variable ink is provided and includes: an ink body; and the magnetic pigment flakes according to any one of above embodiments. The magnetic pigment flakes are doped in the ink body.

According to a third aspect of the present disclosure, an anti-falsification article is provided and includes: an article body, and the optically variable ink according to any one of above embodiments. The optically variable ink is coated on the article body. The magnetic pigment flake of the optically variable ink is magnetically oriented, such that a bright and dark areas are generated with a viewing angel changing under an irradiation of visible light below the predetermined intensity. Under an irradiation of visible light exceeding the predetermined intensity, light with a color different from that of the bright area is generated on a corresponding position of the dark area.

DETAILED DESCRIPTION

The disclosure will now be described in detail with reference to the accompanying drawings and examples. Apparently, the described embodiments are only a part of the embodiments of the present disclosure, not all of the embodiments. All other embodiments obtained by a person of ordinary skill in the art based on the embodiments of the present invention without creative efforts shall fall within the protection scope of the present invention.

It should be noted that if there are directional indications (such as up, down, left, right, front, back, etc.) involved in the embodiments of the present disclosure, the directional indications are only used to explain a relative position relationship and movement between components in a specific posture (as shown in the attached figures). If the specific posture changes, the directional indications are also changed accordingly.

In addition, if there is a description of "first", "second" and the like in the embodiment of the present disclosure, the description of "first", "second" and the like is only used herein for purposes of description, and are not intended to indicate or imply relative importance or significance or to imply the number of indicated technical features. Thus, the feature defined with "first", "second", and the like may include one or more of such a feature. Besides, technical solutions between various embodiments may be combined with each other, but it must be based on the realization by one skilled in the art. When a combination of the technical solutions is contradictory or cannot be achieved, it should be considered that the combination of the technical solutions does not exist and is not are included in the scope of protection of the present disclosure.

According to a first aspect of the present disclosure, a magnetic pigment flake is provided and includes: a filtering film layer, with a magnetic or magnetizable material; and a metal nanoparticles layer, formed on a surface of the filtering film layer. The metal nanoparticles layer is configured to generate scattered light enhanced by a local surface plasmon resonance under an irradiation of visible light exceeding a predetermined intensity.

In an embodiment, a color of the scattered light generated by the metal nanoparticles layer under the local surface plasmon resonance in response to the metal nanoparticles layer being irradiated by the visible light exceeding the predetermined intensity is different from a color of light generated by the metal nanoparticles layer under the local surface plasmon resonance in response to the metal nanoparticles layer being irradiated by the visible light below the predetermined intensity.

In an embodiment, the filtering film layer comprises a magnetic core layer and a first medium layer; the first medium layer is stacked on at least one of main surfaces of the magnetic core layer; the metal nanoparticles layer is arranged on a side of the first medium layer away from the magnetic core layer.

In an embodiment, the filtering film layer further comprises a second medium layer; the second medium layer is arranged between the first medium layer and the magnetic core layer; a refraction index of the second medium layer is less than a refraction index of the first medium layer.

In an embodiment, the refraction index of the second medium layer is less than or equal to 1.65. The second medium layer is selected from at least one of silicon dioxide, aluminium oxide, magnesium fluoride, aluminum fluoride, cerium fluoride, lanthanum fluoride, neodymium fluoride, samarium fluoride, barium fluoride, calcium fluoride, lithium fluoride, polystyrene, polyethylene, polymethyl methacrylate, polyamide imide, polyperfluoroethylene propylene, tetrafluoroethylene, trifluorochloroethylene, cellulose propionate, cellulose acetate, cellulose acetate butyrate, methylpentene polymer, homoformaldehyde, acrylic resin, cellulose nitrate, ethyl cellulose, polypropylene, polysulfone, poly-ethersulfone, mica, heterogeneous isomorphic polymer, polybutene, ionic cross-linked polymer, acrylic copolymer, thermoplastic, styrene butadiene, polyvinyl chloride, urea formaldehyde, styrene acrylonitrile, and polycarbonate.

In an embodiment, the filtering film layer further comprises an absorbing layer and a second medium layer; the absorbing layer and the second medium layer are arranged between the magnetic core layer and the first medium layer; the absorbing layer is closer to the first medium layer than the second medium layer.

In an embodiment, a thickness of the absorbing layer is less than 30 nm. Materials of the absorbing layer are selected from at least one of titanium, aluminum, chromium, nickel, palladium, titanium, vanadium, cobalt, iron, carbon, tin, tungsten, molybdenum, rhodium, and niobium, or selected from an alloy of at least one thereof, or selected from silicon carbide.

In an embodiment, the filtering film layer further comprises a second medium layer. The number of the magnetic core layer is at least two. The second medium layer is arranged between two adjacent magnetic core layers. The first medium layer is arranged on a main surface of the outermost magnetic core layer away from the second medium layer.

In an embodiment, the filtering film layer further comprises a second medium layer and a reflective layer. The number of the magnetic core layer is at least two. The second medium layer and the reflective layer are arranged between two adjacent magnetic core layers. The reflective layer is separated from each of the two adjacent magnetic core layers by the second medium layer. The first medium layer is arranged on a main surface of the outermost magnetic core layer away from the second medium layer.

In an embodiment, materials of the reflective layer are selected from at least one of aluminum, silver, gold, copper, platinum, tin, titanium, palladium, rhodium, niobium, chromium, and alloys thereof. A physical thickness of the reflective layer is in a range from 2 nm to 500 nm.

In an embodiment, an interference cavity is formed by the magnetic core layer and the first medium layer.

In an embodiment, a physical thickness of the magnetic core layer is less than 30 nm. The second medium layer is a dielectric stack with alternating high and low refractive index film layers, or a dielectric film layer. Materials of the second medium layer are selected from at least one of silicon dioxide, aluminium oxide, magnesium fluoride, aluminum fluoride, cerium fluoride, lanthanum fluoride, neodymium fluoride, samarium fluoride, barium fluoride, and calcium fluoride.

In an embodiment, the metal nanoparticles of the metal nanoparticles layer are spaced apart from each other, and a gap of two adjacent metal nanoparticles is in a range from 2 nm to 1 mm.

In an embodiment, a particle size of the metal nanoparticles is in a range from 2 nm to 1 μm. Materials of the metal nanoparticles are selected from at least one of aluminum, silver, gold, copper, platinum, ruthenium, palladium, rhodium, cobalt, iron, nickel, lead, osmium, iridium, and alloys thereof. A shape of the metal nanoparticles is sphere, hemisphere, ellipsoid, cube, cuboid, octahedron, dodecahedron, hexahedron, bar, star, cone, triangle, or cylinder.

In an embodiment, a refraction index of the first medium layer is greater than 1.65.

In an embodiment, the first medium layer is selected from at least one of lanthanum titanate, titanium pentoxide, niobium pentoxide, zinc sulfide, zinc oxide, zirconia, titanium dioxide, carbon, indium oxide, indium tin oxide, tantalum pentoxide, cerium oxide, yttrium oxide, europium oxide, iron oxide, ferroferric oxide, hafnium nitride, hafnium carbide, hafnium oxide, lanthanum oxide, magnesium oxide, neodymium oxide, praseodymium oxide, samarium oxide, antimony trioxide, silicon carbide, silicon nitride, silicon monoxide, selenium trioxide, tin oxide, and tungsten trioxide. The magnetic core layer is made of at least one of iron, cobalt, nickel, gadolinium, terbium, dysprosium and erbium, oxides and alloys thereof.

In an embodiment, the metal nanoparticles layer is arranged on main surfaces of a front and rear sides of the filtering film layer, such that the magnetic pigment flake is arranged with a symmetrical structure centering on the filter film layer.

According to a second aspect of the present disclosure, an optically variable ink is provided and includes: an ink body; and the magnetic pigment flakes according to any one of above embodiments. The magnetic pigment flakes are doped in the ink body.

According to a third aspect of the present disclosure, an anti-falsification article is provided and includes: an article body, and the optically variable ink according to any one of above embodiments. The optically variable ink is coated on the article body. The magnetic pigment flake of the optically variable ink is magnetically oriented, such that a bright and dark areas are generated with a viewing angel changing under an irradiation of visible light below the predetermined intensity. Under an irradiation of the visible light exceeding the predetermined intensity, light with a color different from that of the bright area is generated on a corresponding position of the dark area.

In an embodiment, the anti-falsification article is configured to generate scattered light enhanced by a the local surface plasmon resonance under an irradiation of the light exceeding a predetermined intensity, such that a color generated by the dark area of the anti-falsification article under an irradiation of the light exceeding the predetermined intensity is different from a color generated by the dark area of the anti-falsification article under an irradiation of the light below the predetermined intensity.

Figure 1:
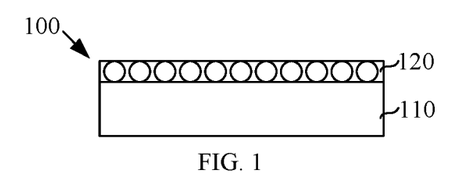
FIG. 1 is a structural view of a magnetic pigment flake according to an embodiment of the present disclosure.

As shown in FIG. 1, FIG. 1 is a structural view of a magnetic pigment flake according to a first embodiment of the present disclosure. The magnetic pigment flake 100 includes a filtering film layer 110 having a magnetic or magnetizable material and a metal nanoparticles layer 120.

The metal nanoparticles layer 120 is formed on a surface of the filtering film layer 110 and configured to generate a local surface plasmon resonance (LSPR) under an irradiation of light exceeding a predetermined intensity, and light scatter-enhancing property with a wavelength selectivity for incident light is generated. The magnetic or magnetizable material of the filtering film layer 110 is directionally arranged in a magnetic field, such that an anti-falsification pattern formed by the filtering film layer 110 generates an obvious shading area, that is, a bright and dark areas. At the same time, cooperating with the light scattering enhancement property of the LSPR of the metal nanoparticles layer 120, a color of the dark area of the anti-falsification pattern formed by the magnetic pigment flake 100 of the present disclosure and irradiated under ambient light is different from a color of the dark area of the anti-falsification pattern irradiated under the visible light exceeding the predetermined intensity. In some embodiments, the ambient light may be visible light below the predetermined intensity. In this case, the anti-falsification pattern formed by the magnetic pigment flake 100 of the present disclosure includes two colors changes in a front view and a side view based on a flip-flap effect of the magnetic or magnetizable material. Further, a third color (that is, a hidden color) is generated by the dark area of the anti-falsification pattern under the irradiation of the light exceeding the predetermined intensity, thus an anti-falsification and imitation difficulty of the anti-falsification pattern formed by the magnetic pigment flake 100 may be effectively improved.

In some embodiments of the present disclosure, the color development of the metal nanoparticles under high-intensity white light is the color of the scattered light enhanced by the local surface plasmon resonance, which is different from a color development by means of the local surface plasmon resonance of nanoparticles. Furthermore, only when a film layer (an outermost film layer of an interference film stack) directly contacted with the metal nanoparticles is a film layer with a high refraction index, and the high refraction index is greater than 1.65, a discoloration effect of the high-intensity white light can be achieved.

When a film layer of $SiO_2$ is arranged with a layer of Ag NPs, or a surface of a film stack of $MgF_2/AL_2O_3/MgF_2$ is arranged with the layer of the Ag NPs, a coloration is generated by a structure as described above due to wavelength-selective light absorption of the local surface plasmon resonance of the Ag NPs. However, the discoloration is not generated under the high-intensity white light. In addition, when a surface of a single film layer of $ZrO_2$ is arranged with the layer of the Ag NPs, the discoloration is also not generated by such structure under the high-intensity white light. In contrast to light absorption of the LSPR used in most of plasmon display devices, some embodiments of the present disclosure use the light scattering enhancement property of the LSPR.

The realization of a scattering color visible to naked eyes has strict requirements on a structure of a F-P film stack. Likewise, there are certain requirements for the ambient light. A bright environment is needed to observe a bright color of a traditional optically variable pigment of an interference type. In some embodiments of the present disclosure, a photochromic effect is generated by an optically variable pigment of a scattered type when the optically variable pigment of the scattered type is irradiated by the high-intensity white light in a dark environment. When an ambient illumination is lower than 300 lx and an illumination of predetermined light source is greater than 3000 lx (preferably, the illumination is greater than 5000 lx), it is possible to generate a better discoloration effect under the high-intensity white light. However, in a sunny outdoor environment, if the ambient illumination is greater than 3000 lx, the discoloration effect under the high-intensity white light is not generated by a sample. In some embodiments of the present disclosure, the optically variable pigment is a pigment generating a color change when the pigment is irradiated by the high-intensity white light in the dark environment, which is different traditional optically variable pigment. The color is changed from a scattered color under the ambient light to a scattered color under the high-intensity white light. In some embodiments, a color temperature of the light source is in a range from 4000K to 8000K.

In some embodiments, a reflection color of light generated by the metal nanoparticles layer 120 irradiated under the ambient light is different from a scattered color of light generated by the metal nanoparticles layer 120 irradiated under the visible light exceeding the predetermined intensity. When the metal nanoparticles layer 120 is irradiated under the visible light exceeding the predetermined intensity, the light passing through the metal nanoparticles layer 120 enters into the filter film layer 110. The filter film layer 110 reflects and interferes the light, such that the light is reflected to the metal nanoparticles layer 120 again, such that the scattered light is further enhanced and modulated. In this case, the metal nanoparticles layer 120 disposed on the surface of the filtering film layer 110 has the light scatter-enhancing property with the wavelength selectivity for the incident light, thus the color of the pigment is changed from reflection color under the ambient light to the scattered color under light of the predetermined intensity.

In some embodiments, a wavelength range of irradiation light is necessary to be overlapped with the wavelength range of the SPR absorption peak of the metal nanoparticles, such that the LSPR is generated by the metal nanoparticles layer 120 under the irradiation light. In some embodiments, the irradiation light may be the visible light, and a wavelength range of the visible light is wide. The LSPR is generated the scattered light enhanced by the metal nanoparticles layer 120, when the visible light with a sufficient intensity is in cooperation with the filter film layer 110.

In some embodiments, materials of the metal nanoparticles layer 120 may be selected from at least one of aluminum, silver, gold, copper, platinum, ruthenium, palladium, rhodium, cobalt, iron, nickel, lead, osmium, iridium, and alloys thereof.

In some embodiments, the SPR absorption peak of the metal nanoparticles in the metal nanoparticles layer 120 is related to a shape and size of the metal nanoparticles. In this case, by changing the shape and/or size of the metal nanoparticles, the anti-falsification pattern changes based on the color change generated by the LSPR, thereby further improving the anti-falsification and imitation difficulty of the anti-falsification pattern.

Specifically, the shape of the metal nanoparticles may be sphere, hemisphere, ellipsoid, cube, cuboid, octahedron, dodecahedron, hexahedron, bar, star, cone, triangle, or cylinder.

A particle size of the metal nanoparticles may be in a range from 2 nm to 1 μm.

In some embodiments, the metal nanoparticles of the metal nanoparticles layer 120 are spaced apart from each other, and a gap of two adjacent metal nanoparticles is in a range from 2 nm to 1 mm, such that the metal nanoparticles are provides with a certain free space, thus the LSPR is generated the scattered light enhanced by the metal nanoparticles layer 120 under certain conditions.

In some embodiments, the filtering film layer 110 may define a Fabry Perot interference cavity.

Further, in this embodiment, the metal nanoparticles layer 120 is arranged on main surfaces of a front and rear sides of the filtering film layer 110, such that the magnetic pigment flake 100 is arranged with a symmetrical structure centering on the filter film layer 110.

A plurality of embodiments based on the first embodiment will be described in details as follows. Specifically, the filter film layer 110 of the magnetic pigment flake 100 will be described in details. It should be noted that the following embodiments can be combined arbitrarily without departing from technical ideas of the present disclosure.

Figure 2:
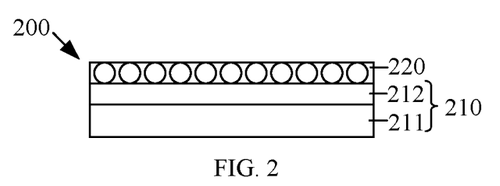
FIG. 2 is a structural view of the magnetic pigment flake according to another embodiment of the present disclosure.

As shown in FIG. 2, FIG. 2 is a structural view of a magnetic pigment flake according to a second embodiment of the present disclosure.

A magnetic pigment flake 200 includes a filtering film layer 210 having the magnetic or magnetizable material and a metal nanoparticles layer 220. The metal nanoparticles layer 220 is formed on a surface of the filtering film layer 210 and configured to generate the scattered light enhanced by the local surface plasmon resonance under an irradiation of light exceeding a predetermined intensity, that is, the local surface plasmon resonance is equal to the LSPR.

In some embodiments, the filtering film layer 210 includes a magnetic core layer 211 and a first medium layer 212, and the first medium layer 212 is stacked on at least one of main surfaces of the magnetic core layer 211. The metal nanoparticles layer 220 is arranged on a side of the first medium layer 212 away from the magnetic core layer 211. An interference cavity is formed by the magnetic core layer 211 and the first medium layer 212, so as to scatter, absorb, and/or diffuse the light, such that the light is re-scattered to the metal nanoparticles layer 220, thus the scattered light enhanced by the LSPR is generated by the metal nanoparticles layer 220 under certain conditions.

In some embodiments, the magnetic core layer 211 has a magnetic or magnetizable material, such that the magnetic pigment flake 200 may be magnetically oriented under an effect of a magnetic field. A physical thickness of the magnetic core layer 211 is in a range from 2 nm to 10000 nm. In some embodiments, a range of the physical thickness of the magnetic core layer 211 is greater than 30 nm, such as 38 nm, 53 nm, 80 nm, or the like.

In some embodiments, the magnetic or magnetizable material of the magnetic core layer 211 are selected from at least one of iron, cobalt, nickel, gadolinium, terbium, dysprosium, erbium, alloys and oxides thereof. Alternatively, the magnetized material is selected from iron-silicon alloy, iron-aluminum alloy, iron-silicon-aluminum alloy, iron-silicon-chromium alloy, and iron-nickel-molybdenum alloy.

In some embodiments, the magnetic core layer 211 may be a single-layer structure.

In another embodiment, the magnetic core layer 211 may be a multi-layer composite structure, such as a M1M0M2 structure, a M0M1M0 structure, a M0M1 structure, a M1D1M0D2M2 structure, a M0D1M1D2M0 structure, a M1D1M0 structure, or the like. In some embodiment, the M0 is a magnetic film layer, and materials of the magnetic film layer are selected from iron, cobalt, nickel, gadolinium, terbium, dysprosium, erbium, alloys and oxides thereof. Alternatively, the materials of the magnetic film layer are selected from iron-silicon alloy, iron-aluminum alloy, iron-silicon-aluminum core, iron-silicon-chromium alloy, and iron-nickel-molybdenum, and alloys thereof. The M1 or M2 is a metal film layer, and materials of the metal film layer are selected from aluminum, silver, gold, copper, platinum, tin, titanium, palladium, rhodium, niobium, chromium, and alloys thereof. The D1 or D2 is a dielectric film layer, and the materials of the dielectric film layer are selected from silicon dioxide, aluminium oxide, magnesium fluoride, aluminum fluoride, cerium fluoride, lanthanum fluoride, neodymium fluoride, samarium fluoride, barium fluoride, and calcium fluoride. By changing a variable structure of the magnetic core layer 211, an interference effect of the interference cavity on the light can be more changeable, such that the anti-falsification pattern made by the magnetic pigment flake 200 can be more changeable, thereby improving the anti-falsification and imitation difficulty of the anti-falsification pattern.

In addition, a refraction index of the first medium layer 212 is greater than a threshold, such that light intensity of the light re-scattered into the metal nanoparticles layer 220 by the filtering film layer 210, thus a color change generated by the metal nanoparticles layer 220 under the LSPR may be detected by the human eyes, thereby improving the anti-falsification the anti-falsification pattern. In some embodiments, the threshold may be set based on specific situations, such as 1.65 or 1.80.

Further, the first medium layer 212 may be made of at least one of lanthanum titanate, titanium pentoxide, niobium pentoxide, zinc sulfide, zinc oxide, zirconia, titanium dioxide, carbon, indium oxide, indium tin oxide, tantalum pentoxide, cerium oxide, yttrium oxide, europium oxide, iron oxide, ferroferric oxide, hafnium nitride, hafnium carbide, hafnium oxide, lanthanum oxide, magnesium oxide, neodymium oxide, praseodymium oxide, samarium oxide, antimony trioxide, silicon carbide, silicon nitride, silicon monoxide, selenium trioxide, tin oxide, and tungsten trioxide.

In some embodiments, a physical thickness of the first medium layer 212 is in a range from 30 nm to 80 nm. The physical thickness may be 20 nm, 25 nm, 50.5 nm, 70 nm, 85 nm, 99 nm, 100 nm, or the like.

In some embodiments, a coefficient of the film thicknesses of the first medium layer 212 may be less than or equal to 6, such as 0, 2, 4, or the like.

Figure 3:
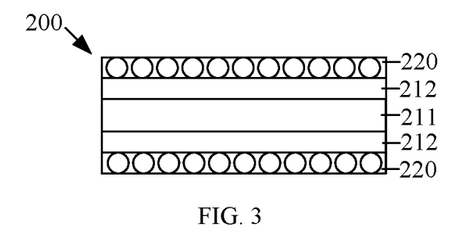
FIG. 3 is a structural view of the magnetic pigment flake according to yet another embodiment of the present disclosure.

As shown in FIG. 3, in this embodiment, the first medium layers 212 are arranged on main surfaces of a front and rear sides of the magnetic core layer 211 of the magnetic pigment flake 200. Further, the metal nanoparticles layer 220 is arranged on a side surface of each of the first medium layers 212 away from the magnetic core layer 211, such that the magnetic pigment flake 200 is arranged with a five-layer symmetrical structure centering on the magnetic core layer 211. In some embodiments, as shown in FIG. 3, two first medium layers 212 of the magnetic pigment flake 200 may have the same materials or different materials.

Figure 4:
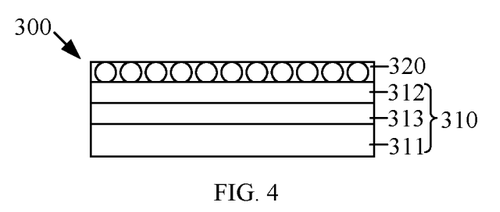
FIG. 4 is a structural view of the magnetic pigment flake according to yet another embodiment of the present disclosure.

As shown in FIG. 4, FIG. 4 is a structural view of a magnetic pigment flake according to a third embodiment of the present disclosure.

The magnetic pigment flake 300 includes a filtering film layer 310 having a magnetic or magnetizable material and a metal nanoparticles layer 320. The metal nanoparticles layer 320 is formed on a surface of the filtering film layer 310 and configured to generate the scattered light enhanced by the local surface plasmon resonance under an irradiation of the light exceeding a predetermined intensity.

In some embodiments, the filtering film layer 310 includes a magnetic core layer 311 and a first medium layer 312, and the first medium layer 312 is stacked on at least one of main surfaces of the magnetic core layer 311. In some embodiments, the metal nanoparticles layer 320 is arranged on a side of the first medium layer 312 away from the magnetic core layer 311. Properties and structures of the magnetic core layer 311 and the first medium layer 312 may refer to the second embodiment, which will not be repeated here.

The filtering film layer 310 further includes a second medium layer 313. The second medium layer 313 is arranged between the first medium layer 312 and the magnetic core layer 311. In addition, a refraction index of the second medium layer 313 is less than that of the first medium layer 312.

In the embodiments, a stacking structure formed by different medium layers with different refraction index is arranged on at least one of the main surfaces of the magnetic core layer 311, such that a multi-color composite development effect is achieved, thus the magnetic pigment flake 300 has a higher reflectance and lower valley, so as to reduce an effect of the ink on the color development and an effect of an interface inversion, thereby further increasing a color development effect of the magnetic pigment flake 300 in the ink. In this way, a reflectance to ultraviolet rays of the magnetic pigment flake 300 is also increased, such that the color change generated by LSPR is more obvious when the irradiation light is ultraviolet light, thereby increasing an anti-aging performance of the magnetic pigment flake 300, and reducing costs.

In some embodiments, the refraction index of the second medium layer 313 is less than a threshold. In some embodiments, the threshold may be set based on the specific situations, such as 1.65 or 1.80.

In some embodiments, materials of the second medium layer 313 include at least one of silicon dioxide, aluminium oxide, magnesium fluoride, aluminum fluoride, cerium fluoride, lanthanum fluoride, neodymium fluoride, samarium fluoride, barium fluoride, calcium fluoride, lithium fluoride, polystyrene, polyethylene, polymethyl methacrylate (PMMA), polyamide imide, polyperfluoroethylene propylene, tetrafluoroethylene, trifluorochloroethylene, cellulose propionate, cellulose acetate, cellulose acetate butyrate, methylpentene polymer, homoformaldehyde, acrylic resin, cellulose nitrate, ethyl cellulose, polypropylene, polysulfone, poly-ethersulfone, mica, heterogeneous isomorphic polymer, polybutene, ionic cross-linked polymer, acrylic copolymer, thermoplastic, styrene butadiene, polyvinyl chloride (PVC), urea formaldehyde, styrene acrylonitrile, and polycarbonate.

In some embodiments, a physical thickness of the second medium layer 313 is greater than 30 nm. Specifically, the physical thickness is in a range from 80 nm to 180 nm, such as 80 nm, 100 nm, 105 nm, 150.5 nm, 160 nm, 180 nm, or the like.

In some embodiments, a coefficient of the film thicknesses of the second medium layer 313 may be less than or equal to 6, such as 0, 2, 4, or the like.

Further, a first dielectric stack may be arranged on at least one of the main surfaces of the magnetic core layer 311, and the first dielectric stack is formed by a plurality of the first medium layer 312 and the second medium layer 313. In this way, a plurality of film layers are stacked, such that the multi-color composite development effect is achieved, and at the same time, a translucent color development effect is also achieved. The first medium layer 312 disposed on the main surfaces of the magnetic core layer 311 and the second medium layer 313 are arranged alternately. In each first dielectric stack, the second medium layer 313 is closer to the magnetic core layer 311 than the first medium layer 312, thereby meeting design requirements of a film system.

Figure 16:
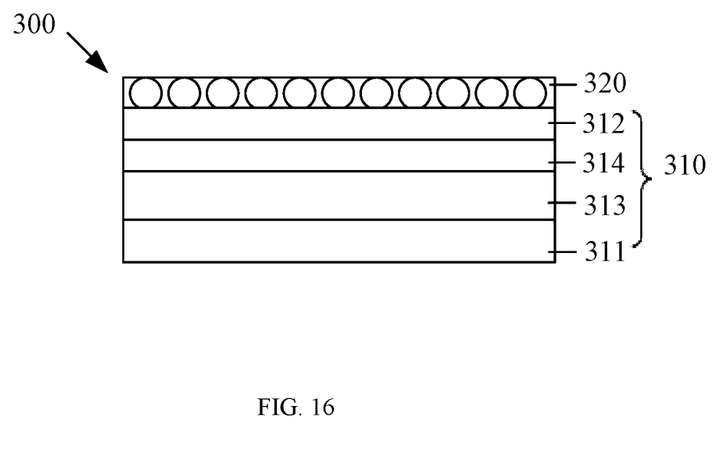
FIG. 16 is a structural view of the magnetic pigment flake according to yet another embodiment of the present disclosure.

In addition, in this embodiment, the first dielectric stack may include at least three medium layers with different refractive indices, so as to improve uniformity of the refractive index change of the first dielectric stack. For example, as shown in FIG. 16, the first dielectric stack may further include a third medium layer 314 arranged between the first medium layer 312 and the second medium layer 313. A refractive index of the third medium layer 314 is less than that of the first medium layer 312, and greater than that of the second medium layer 313.

Figure 5:
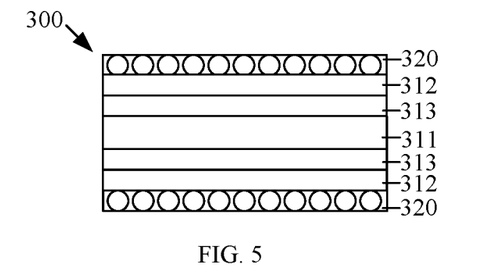
FIG. 5 is a structural view of the magnetic pigment flake according to yet another embodiment of the present disclosure.

As shown in FIG. 5, in this embodiment, the first medium layers 312 are arranged on the main surfaces of a front and rear sides of the magnetic core layer 311. Further, the metal nanoparticles layer 320 is arranged on a side surface of each of the first medium layers 312 away from the magnetic core layer 311, and the second medium layer 313 is arranged between the each of the first medium layers 312 and the magnetic core layer 311, such that the magnetic pigment flake 300 is arranged with a seven-layer symmetrical structure centering on the magnetic core layer 311.

In some embodiments, a plurality of the second medium layers 313 of the magnetic pigment flake 300 may be made of the same materials or different materials.

Figure 6:
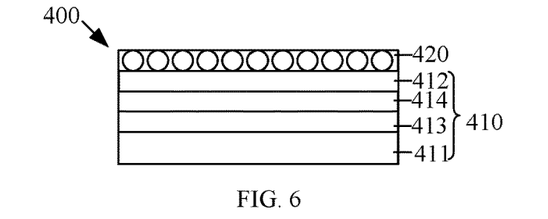
FIG. 6 is a structural view of the magnetic pigment flake according to yet another embodiment of the present disclosure.

As shown in FIG. 6, FIG. 6 is a structural view of a magnetic pigment flake according to a fourth embodiment of the present disclosure.

The magnetic pigment flake 400 includes a filtering film layer 410 having a magnetic or magnetizable material and a metal nanoparticles layer 420. The metal nanoparticles layer 420 is formed on a surface of the filtering film layer 410 and configured to generate the scattered light enhanced by the local surface plasmon resonance under an irradiation of the light exceeding a predetermined intensity.

In some embodiments, the filtering film layer 410 includes a magnetic core layer 411 and a first medium layer 412, and the first medium layer 412 is stacked on at least one of main surfaces of the magnetic core layer 411. In some embodiments, the metal nanoparticles layer 420 is arranged on a side of the first medium layer 412 away from the magnetic core layer 411. Properties and structures of the magnetic core layer 411 and the first medium layer 412 may refer to the second embodiment, which will not be repeated here.

The filtering film layer 410 further includes an absorbing layer 414 and a second medium layer 413. The absorbing layer 414 and the second medium layer 413 are arranged between the magnetic core layer 411 and the first medium layer 412. The absorbing layer 414 is closer to the first medium layer 412 than the second medium layer 413.

An interference cavity is formed by the magnetic core layer 411, the second medium layer 413, the absorbing layer 414, and the first medium layer 412, so as to scatter, absorb, and/or diffuse the light, such that the light is re-scattered to the metal nanoparticles layer 420, thus the scattered light enhanced by the LSPR is generated by the metal nanoparticles layer 420 under certain conditions. Light in the specific wavelength band is absorbed by the absorbing layer 414, such that the spectrum becomes narrower, thereby increasing a color saturation and color development chromaticity of the magnetic pigment flake 400. Further, a magnetic reflective layer may be protected by the second medium layer 413, so as to improve whole tolerance of the magnetic pigment flake 400.

The absorbing layer 414 may have a translucent property, such that a part of the light may pass through the absorbing layer 414. A thickness of the absorbing layer 414 is limited to make the absorbing layer 414 meet the translucent property. Specifically, a physical thickness of the absorbing layer 414 is less than 30 nm, such as 3 nm, 5 nm, 8 nm, 10 nm, 12 nm, 15 nm, 18 nm, or 20 nm.

Materials of the absorbing layer 414 may be selected from at least one of titanium, aluminum, chromium, nickel, palladium, titanium, vanadium, cobalt, iron, carbon, tin, tungsten, molybdenum, rhodium, niobium, and silicon carbide. In other words, the absorbing layer 414 may be made of the above elemental material, or alloy material composed of the above elements.

In addition, a refractive index of the second medium layer 413 is not limited, and may be greater than or equal to a threshold. Alternatively, the refractive index may be less than the threshold. The threshold may be set based on the specific situations, such as 1.65 or 1.80, which is not limited herein.

Materials of the second medium layer 413 may be at least one of silicon dioxide, magnesium fluoride, titanium dioxide, aluminium oxide, silicon monoxide, and cryolite.

In some embodiments, the second medium layer 413 may be a dielectric film layer, or a dielectric stack with alternating high and low refractive index film layers.

In some embodiments, a coefficient of the film thicknesses of the second medium layer 413 may be less than or equal to 6, such as 0, 2, 4, or the like.

In addition, a second dielectric stack may be arranged between the first medium layer 412 and the magnetic core layer 411, and the second dielectric stack is formed by a plurality of the second medium layer 413 and the absorbing layer 414. In this way, a plurality of film layers are stacked, such that the multi-color composite development effect is achieved, and at the same time, the translucent color development effect is also achieved. In some embodiments, the magnetic core layer 411, the second dielectric stack arranged on the at least one of main surfaces of the magnetic core layer 411, the first medium layer 412, and the metal nanoparticles basically determine a main color and a final color of the magnetic pigment flake 400, and the main color is viewing in a front view, and the final color is viewing at a viewing angel deviating from a normal direction of the main surface of the magnetic core layer 411 by 90 degrees or close to 90 degrees. Based on this case, an additional interference cavity may be formed by the additional second dielectric stack, such that a reflection peak in the specific wavelength band is selectively absorbed and filtered. In this way, when the viewing angel changes, a half width of the reflection peak in the specific wavelength band becomes narrower, such that an obvious color boundary is formed between different colors that can be observed, which is reflected in the color as discrete changes.

The reason why a color of the magnetic pigment flake 400 shows discrete changes is that due to a selective absorption of the absorbing layer 414 and the second medium layer 413 back and forth for many times, it plays a filtering role and filters out stray light near light with the highest reflection wavelength, such that when an interference occurs, light waves of a specific wavelength are constructively interfered, and light of wavelengths near the specific wavelength and other wavelengths are largely suppressed due to being filtered. In this way, when the viewing angel changes, a half width of the reflection peak in the specific wavelength band becomes narrower, such that the obvious color boundary is formed between the different colors that can be observed, which is reflected in the color as discrete changes.

The magnetic pigment flake 400 of the present disclosure has at least four colors. For example, when the viewing angel deviates from the normal direction of the main surface of the magnetic core layer 411 by 0 degree or close to 0 degree, for example, in a range from 0 degree to 5 degrees, the magnetic pigment flake 400 has a first color. When the viewing angel deviates from the normal direction of the main surface of the magnetic core layer 411 greater than 0 degree or 5 degrees and less than or equal to 45 degrees, the magnetic pigment flake 400 has a second color. When the viewing angel deviates from the normal direction of the main surface of the magnetic core layer 411 greater than 45 degrees and less than or equal to 90 degrees, the magnetic pigment flake 400 has a third color. The obvious color boundary is formed between the first color, the second color, and the third color. When the viewing angel is any degrees, a fourth color may be generated by the dark area formed by the magnetic pigment flake 400 and the LSPR of the metal nanoparticles layer 420, and the fourth color is the hidden color. In this way, in cooperation with the metal nanoparticles layer 420, a richer colors change is formed by the magnetic pigment flake 400, thereby improving the anti-falsification and imitation difficulty of the anti-falsification pattern formed by the magnetic pigment flake 400.

In some embodiments, in each second dielectric stack, the second medium layer 413 is closer to the magnetic core layer 411 than the absorbing layer 414.

Figure 7:
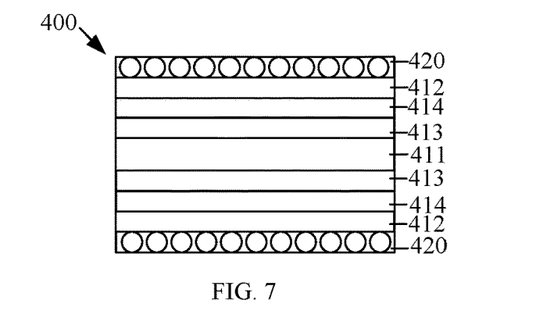
FIG. 7 is a structural view of the magnetic pigment flake according to yet another embodiment of the present disclosure.

As shown in FIG. 7, in this embodiment, the first medium layers 412 are arranged on the main surfaces of a front and rear sides of the magnetic core layer 411. Further, the metal nanoparticles layer 420 is arranged on a side surface of each of the first medium layers 412 away from the magnetic core layer 411, and the absorbing layer 414 and the second medium layer 413 are arranged between the each of the first medium layers 412 and the magnetic core layer 411, such that the magnetic pigment flake 400 is arranged with a nine-layer symmetrical structure centering on the magnetic core layer 411.

Figure 8:
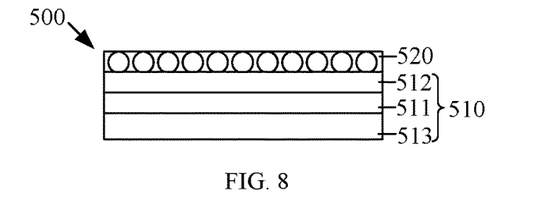
FIG. 8 is a structural view of the magnetic pigment flake according to yet another embodiment of the present disclosure.

As shown in FIG. 8, FIG. 8 is a structural view of a magnetic pigment flake according to a fifth embodiment of the present disclosure.

The magnetic pigment flake 500 includes a filtering film layer 510 having a magnetic or magnetizable material and a metal nanoparticles layer 520. The metal nanoparticles layer 520 is formed on a surface of the filtering film layer 510 and configured to generate the scattered light enhanced by the local surface plasmon resonance under an irradiation of the light exceeding a predetermined intensity.

In some embodiments, the filtering film layer 510 includes a first medium layer 512, a magnetic core layer 511, and a second medium layer 512 sequentially stacked. The metal nanoparticles layer 520 is arranged on a side of the first medium layer 512 away from the magnetic core layer 511.

An interference cavity is formed by the second medium layer 513, the magnetic core layer 511, and the first medium layer 512, so as to scatter, absorb, and/or diffuse the light, such that the light is re-scattered to the metal nanoparticles layer 520, thus the LSPR is generated by the metal nanoparticles layer 520 under certain conditions. Further, in this embodiment, the filtering film layer 510 is configured to reflect the second medium layer 513. In this way, it is not necessary to increase a thickness of the magnetic core layer 511 in order to improve a reflectance of the filter film layer 510. Further, the filter film layer 510 is thinner, such that it is not easily to form a demagnetizing field inside the filter film layer 510, thus there are fewer magnetic domain, energy of a magnetic domain wall is higher, and a magnetic permeability is increased, so as to make the magnetic pigment flake 500 easier to magnetize and have a better color development effect.

In some embodiments, properties and structures of the first medium layer 512 may refer to the second embodiment, which will not be repeated here.

In some embodiments, the magnetic core layer 511 has a magnetic or magnetizable material, such that the magnetic pigment flake 500 may be magnetically oriented under an effect of a magnetic field. A physical thickness of the magnetic core layer 511 is in a range from 2 nm to 10000 nm. In some embodiments, a range of the physical thickness of the magnetic core layer 511 is less than 30 nm, such as 2 nm, 10 nm, 15 nm, 20 nm, or the like, such that at least a part of the light may pass through the magnetic core layer 511. Further, a thickness of the magnetic core layer 511 is thinner, such that it is not easily to form the demagnetizing field inside the filter film layer 510, thus there are fewer magnetic domain, the energy of the magnetic domain wall is higher, and the magnetic permeability is increased, so as to make the magnetic pigment flake 500 easier to magnetize and have the better color development effect.

In some embodiments, the magnetic core layer 511 may be a single-layer structure. Alternatively, the magnetic core layer 511 may be a multi-layer composite structure.

In addition, a refractive index of the second medium layer 513 is not limited, and may be greater than or equal to a threshold. Alternatively, the refractive index may be the threshold. The threshold may be set based on the specific situations, such as 1.65 or 1.80, which is not limited herein.

Materials of the second medium layer 513 may be at least one of silicon dioxide, magnesium fluoride, titanium dioxide, aluminium oxide, silicon monoxide, and cryolite.

In some embodiments, the second medium layer 513 may be the dielectric film layer, or the dielectric stack with alternating high and low refractive index film layers.

Figure 9:
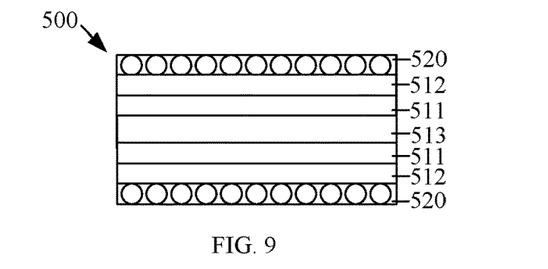
FIG. 9 is a structural view of the magnetic pigment flake according to yet another embodiment of the present disclosure.

Further, as shown in FIG. 9, in this embodiment, the number of the magnetic core layer 511 is at least two. The second medium layer 513 is arranged between two adjacent magnetic core layers 511. The first medium layer 512 is arranged on a main surface of the outermost magnetic core layer 511 away from the second medium layer 513. The metal nanoparticles layer 520 is arranged on a main surface of the first medium layer 512 away from the second medium layer 513, such that the magnetic pigment flake 500 is arranged with a seven-layer symmetrical structure centering on the second medium layer 513. In this case, magnetic moments between at least two magnetic core layers 511 affect each other, such that when the magnetic pigment sheet 500 is magnetized, a better color development effect is formed.

Figure 10:
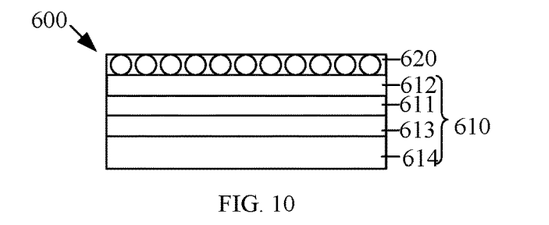
FIG. 10 is a structural view of the magnetic pigment flake according to yet another embodiment of the present disclosure.

As shown in FIG. 10, FIG. 10 is a structural view of a magnetic pigment flake according to a sixth embodiment of the present disclosure.

The magnetic pigment flake 600 includes a filtering film layer 610 having a magnetic or magnetizable material and a metal nanoparticles layer 620. The metal nanoparticles layer 620 is formed on a surface of the filtering film layer 610 and configured to generate the scattered light enhanced by the local surface plasmon resonance under an irradiation of the light exceeding a predetermined intensity.

In some embodiments, the filtering film layer 610 includes a first medium layer 612, a magnetic core layer 611, a second medium layer 613, and a reflective layer 614 sequentially stacked. The metal nanoparticles layer 620 is arranged on a side of the first medium layer 612 away from the magnetic core layer 611.

An interference cavity is formed by the second medium layer 613, the magnetic core layer 611, the first medium layer 612, and the reflective layer 614, so as to scatter, absorb, and/or diffuse the light, such that the light is re-scattered to the metal nanoparticles layer 620, thus the LSPR is generated by the metal nanoparticles layer 620 under certain conditions. Further, in this embodiment, the filtering film layer 610 is configured to reflect the reflective layer 614. In this way, it is not necessary to increase a thickness of the magnetic core layer 611 in order to improve a reflectance of the filter film layer 610. Further, the filter film layer 610 is thinner, such that it is not easily to form a demagnetizing field inside the filter film layer 610, thus there are fewer magnetic domain, the energy of the magnetic domain wall is higher, and the magnetic permeability is increased, so as to make the magnetic pigment flake 600 easier to magnetize and have the better color development effect.

In some embodiments, properties and structures of the first medium layer 612 may refer to the second embodiment, which will not be repeated here. Properties and structures of the second medium layer 613 may refer to the fifth embodiment, which will not be repeated here.

In some embodiments, the magnetic core layer 611 has a magnetic or magnetizable material, such that the magnetic pigment flake 600 may be magnetically oriented under an effect of a magnetic field. A physical thickness of the magnetic core layer 611 is in a range from 2 nm to 10000 nm. In some embodiments, a range of the physical thickness of the magnetic core layer 611 is less than 30 nm, such as 2 nm, 10 nm, 16 nm, 20 nm, or the like, such that at least a part of the light may pass through the magnetic core layer 611. Further, a thickness of the magnetic core layer 611 is thinner, such that it is not easily to form the demagnetizing field inside the filter film layer 610, thus there are fewer magnetic domain, the energy of the magnetic domain wall is higher, and the magnetic permeability is increased, so as to make the magnetic pigment flake 600 easier to magnetize and have the better color development effect.

In some embodiments, the magnetic core layer 611 may be a single-layer structure. Alternatively, the magnetic core layer 611 may be a multi-layer composite structure.

In addition, the reflective layer 614 may be made of metal. Further, materials of the reflective layer 614 may be selected from aluminum, silver, gold, copper, platinum, tin, titanium, palladium, rhodium, niobium, chromium, and alloys thereof.

A physical thickness of the reflective layer 614 is in a range from 2 nm to 500 nm, such as 30 nm, 50 nm, or 80 nm.

Figure 11:
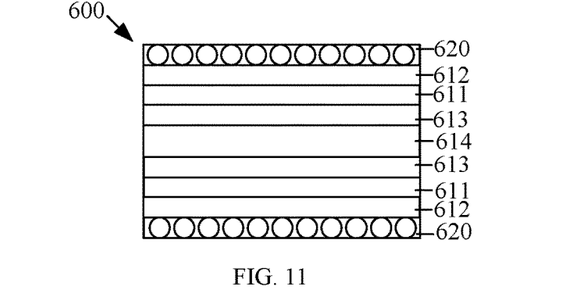
FIG. 11 is a structural view of the magnetic pigment flake according to yet another embodiment of the present disclosure.

Further, as shown in FIG. 11, in this embodiment, the number of the magnetic core layer 611 is at least two. The second medium layer 613 and the reflective layer 614 are arranged between two adjacent magnetic core layers 611. Further, the reflective layer 614 is separated from each of the two adjacent magnetic core layers 611 by the second medium layer 613. The first medium layer 612 is arranged on a main surface the outermost magnetic core layer 611 away from the second medium layer 613. The metal nanoparticles layer 620 is arranged on a main surface of the first medium layer 612 away from the second medium layer 613, such that the magnetic pigment flake 600 is arranged with a nine-layer symmetrical structure centering on the reflective layer 614. In this case, magnetic moments between at least two magnetic core layers 611 affect each other, such that when the magnetic pigment sheet 600 is magnetized, a better color development effect is formed.

In the plurality of embodiments as described above, the magnetic pigment flake may be manufactured by a process, such as physical vapor deposition, chemical vapor deposition, sol-gel method, dipping method, and so on.

In some embodiments, in the plurality of the embodiments as described above, the magnetic pigment flake may be mixed with an ink body, so as to manufacture an optically variable ink.

Of course, the optically variable ink of the magnetic pigment flake of the present disclosure may be coated on an article body to manufacture an anti-falsification article. The magnetic pigment flake of the optically variable ink is magnetically oriented, such that the bright and dark areas are generated with the viewing angel changing under an irradiation of light below the predetermined intensity. Further, under the irradiation of the visible light exceeding the predetermined intensity, light with a color different from that of the bright area is generated on a corresponding position of the dark area.

In order to describe an effect of the metal nanoparticles layer of the present disclosure, a following comparative example and a plurality of examples are provided by the present disclosure.

A Comparative Example

Figure 12:
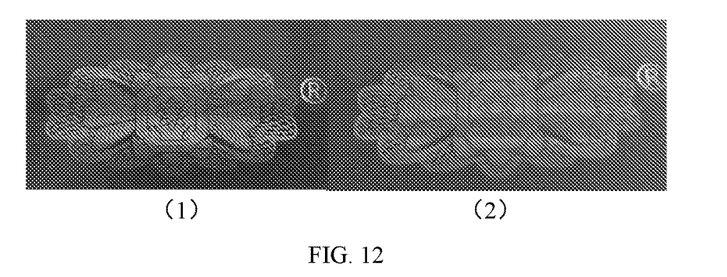
FIG. 12 is a schematic view of an anti-falsification pattern made of an optically variable ink of a magnetic pigment flake in a comparative example of the present disclosure.

A base layer is provided. Specifically, the base layer may be a rigidity or flexible base. For example, materials of the base layer may be a quartz glass or polyethylene terephthalate (PET). An isolation layer is formed on the base layer. A first medium layer, a second medium layer, a metal film layer, a magnetic film layer, the metal film layer, the second medium layer, and the first medium layer are sequentially deposited on the isolation layer. Specifically, on the rigidity base, the isolation layer, the first medium layer, the second medium layer, the metal film layer, the magnetic film layer, the metal film layer, the second medium layer, and the first medium layer are set to cycles. In this case, vapor deposition is repeatedly performed for 20 to 30 times, or more times. The magnetic pigment flake deposited on the base layer is detached by a dry process or wet process, the magnetic pigment flake after grinded is mixed with the ink so as to manufacture the optically variable ink, and the optically variable ink is printed on a substrate. A pattern of the optically variable ink printed on the substrate is magnetized. It may be observed that an effect of the pattern of the optically variable ink after magnetization. As shown in FIG. 12, by observing the effect of the pattern of the optically variable ink made in the comparative example after magnetization, it may be seen that when the optically variable ink pattern is rotated under the ambient light, the dark area of the pattern is gradually displaced, the pattern has a rolling effect, and a pattern color gradually changes from blue to purple.

A First Example

Figure 13:
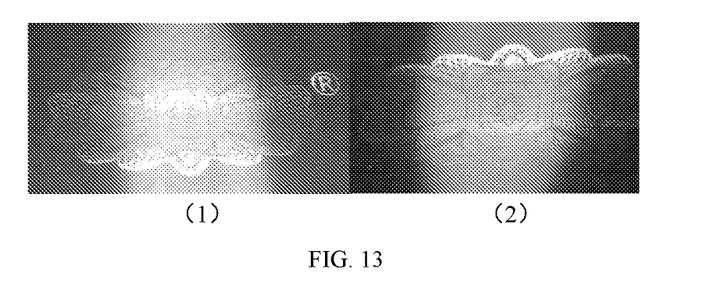
FIG. 13 is a schematic view of an anti-falsification pattern made of an optically variable ink of the magnetic pigment flake in a first example of the present disclosure.
Figure 14:
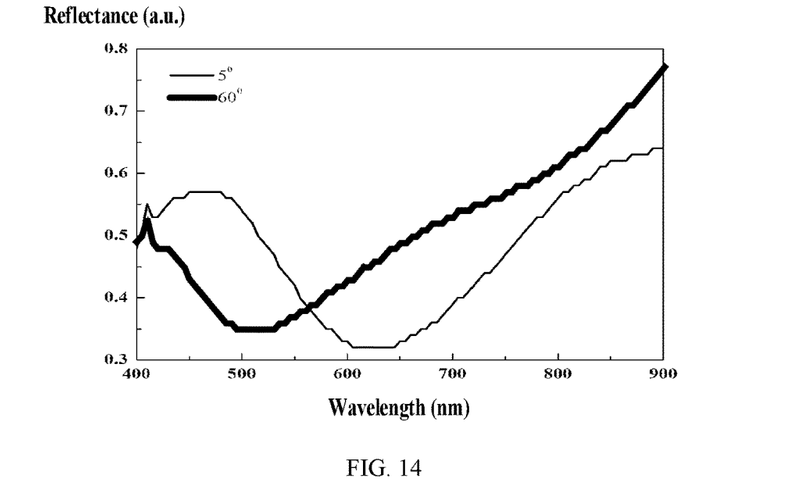
FIG. 14 is a schematic view of a reflectance-wavelength spectrum of the anti-falsification pattern made of the optically variable ink of the magnetic pigment flake in the first example t of the present disclosure.
Figure 15:
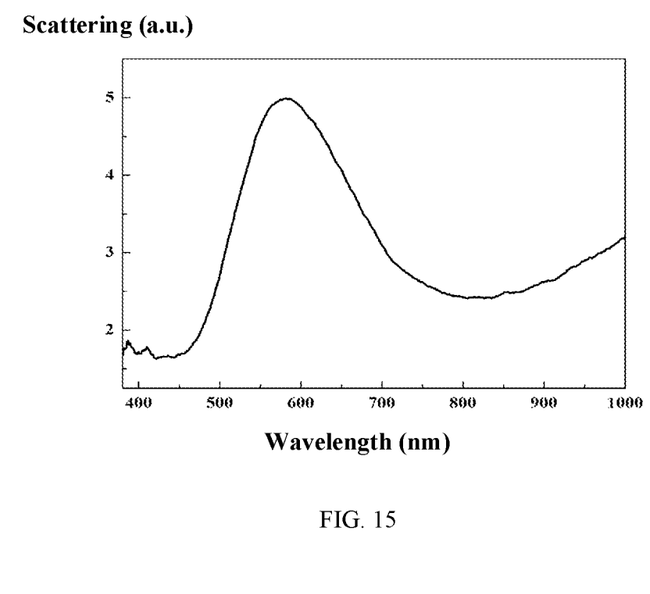
FIG. 15 is a schematic diagram of a scattering spectrum of the magnetic pigment flake after scratching in the first example of the present disclosure.

A base layer is provided. Specifically, the base layer may be a rigidity or flexible base. For example, materials of the base layer may be the quartz glass or PET. An isolation layer is formed on the base layer. A metal nanoparticles layer, a first medium layer, a second medium layer, a metal film layer, a magnetic film layer, the metal film layer, the second medium layer, the first medium layer, and the metal nanoparticles layer are sequentially deposited on the isolation layer. Specifically, on the rigidity base, the isolation layer, the metal nanoparticles layer, the first medium layer, the second medium layer, the metal film layer, the magnetic film layer, the metal film layer, the second medium layer, the first medium layer, and the metal nanoparticles layer are set to cycles. In this case, vapor deposition is repeatedly performed for 20 to 30 times, or more times. The magnetic pigment flake deposited on the base layer is detached by the dry process or wet process, the magnetic pigment flake after grinded is mixed with the ink so as to manufacture the optically variable ink, the optically variable ink is printed on a substrate. A pattern of the optically variable ink printed on the substrate is magnetized. It may be observed that an effect of the pattern of the optically variable ink after magnetization. As shown in FIG. 13, it may be observed that an effect of the pattern of the optically variable ink after magnetization. As shown in FIG. 14, it may be observed that a reflectance-wavelength spectrum of the optically variable ink after magnetization. Besides, an ordinate or y-axis incidents the reflectance, and an abscissa or x-axis incidents the wavelength. A thin line indicates a spectral curve of the optically variable ink pattern in the front view direction, for example, the viewing angel deviating from the normal direction of the main surface of the magnetic core layer by 5 degrees. A thick line indicates a spectral curve of the optically variable ink pattern in a side view direction, for example, the viewing angel deviating from the normal direction of the main surface of the magnetic core layer by 60 degrees. In this case, it may be seen that when the optically variable ink pattern is rotated under the ambient light, the dark area of the pattern is gradually displaced, and the pattern has a rolling effect. At the same time, under the ambient light, when the viewing angle changes from 5 degrees to 60 degrees, a pattern color gradually changes from blue to purple. Further, combined with a scattering spectrum of the optically variable ink after scraping under strong light shown in FIG. 15 and an observation in FIG. 13, it can be seen that under an irradiation of strong visible light, enhanced scattered light is generated in the patterned dark area due to the LSPR of the metal nanoparticles, such that a color of the dark area of the pattern becomes yellow, while a color of the bright area remains unchanged. When the pattern is rotated, the blue, namely, the color of the bright area, and the yellow color, namely, the color of the dark area, are gradually displaced, thereby generating the rolling effect, which may be changed alternately. Therefore, under an irradiation of the strong visible light, there is no obvious dark area, and the color of the pattern is composed of the color of the bright area and the hidden color.

A Second Example

A base layer is provided. Specifically, the base layer may be a rigidity or flexible base. For example, materials of the base layer may be the quartz glass or PET. An isolation layer is formed on the base layer. A metal nanoparticles layer, a first medium layer, a second medium layer, a metal film layer, a magnetic film layer, the metal film layer, the second medium layer, the first medium layer, and the metal nanoparticles layer are sequentially deposited on the isolation layer. Specifically, on the rigidity base, the isolation layer, the metal nanoparticles layer, the first medium layer, the second medium layer, the metal film layer, the magnetic film layer, the metal film layer, the second medium layer, the first medium layer, and the metal nanoparticles layer are set to a circle. In this case, vapor deposition is repeatedly performed for 20 to 30 times, or more times. The magnetic pigment flake deposited on the base layer is detached by the dry process or wet process, so as to obtain the magnetic pigment flake.

A Third Example

By using a winding coating device, a base layer is provided. Specifically, the base layer may be a flexible base. For example, materials of the base layer may be the PET. An isolation layer is formed on the base layer. A metal nanoparticles layer, a first medium layer, a second medium layer, a metal film layer, a magnetic film layer, the metal film layer, the second medium layer, the first medium layer, and the metal nanoparticles layer are sequentially deposited on the isolation layer. A specific detaching method may be the dry process, the wet process, a transfer printing, or a method of using an adhesive base to attach and detach.

A Fourth Example

By using the winding coating device, a base layer is provided. Specifically, the base layer may be a flexible base. For example, materials of the base layer may be the PET. An isolation layer is formed on the base layer. A first medium layer, an absorbing layer, a second medium layer, a magnetic film layer, the second medium layer, the absorbing layer, and the first medium layer are sequentially deposited on the isolation layer. The specific detaching method may be the dry process, the wet process, the transfer printing, or the method of using the adhesive base to attach and detach. In this case, metal nanoparticles grow up on a pigment by a chemical process.

The above are only embodiments of the present disclosure and are not intended to limit the scope of the present disclosure. Any equivalent structural changes made under the concept of the present disclosure, using the contents of the specification of the present disclosure and the accompanying drawings, or applied directly/indirectly in other related fields of technology are included in the scope of protection of the present disclosure.

What is claimed is:

1. A magnetic pigment flake, comprising:
   a filtering film layer, with a magnetic or magnetizable material; and
   a metal nanoparticles layer, formed on a surface of the filtering film layer;
   wherein the metal nanoparticles layer has a light scatter-enhancing property with a wavelength selectivity for incident light, the metal nanoparticles layer is configured to generate scattered light enhanced by a local surface plasmon resonance under an irradiation of visible light exceeding a predetermined intensity, and the filtering film layer has a Fabry Perot interference cavity; a color of the metal nanoparticles layer under the local surface plasmon resonance in response to the metal nanoparticles layer being irradiated by the visible light exceeding the predetermined intensity is different from a color of the metal nanoparticles layer under the local surface plasmon resonance in response to the metal nanoparticles layer being irradiated by the visible light below the predetermined intensity.

2. The magnetic pigment flake according to claim 1, wherein metal nanoparticles layer has a scattered color in response to being irradiated by the visible light being greater than 3000 lx and has a reflection color in response to being irradiated by the visible light being lower than 300 lx.

3. The magnetic pigment flake according to claim 1, wherein a particle size of the metal nanoparticles is in a range from 2 nm to 1 μm;
   materials of the metal nanoparticles are selected from at least one of aluminum, silver, gold, copper, platinum, ruthenium, palladium, rhodium, cobalt, iron, nickel, lead, osmium, iridium, and alloys thereof;
   a shape of the metal nanoparticles is sphere, hemisphere, ellipsoid, cube, cuboid, octahedron, dodecahedron, hexahedron, bar, star, cone, triangle, or cylinder.

4. The magnetic pigment flake according to claim 1, wherein the filtering film layer comprises a magnetic core layer and a first medium layer stacked on the magnetic core layer, the metal nanoparticles layer is arranged on a side surface of the first medium layer away from the magnetic core layer, a refraction index of the first medium layer is greater than 1.65; and
   the metal nanoparticles of the metal nanoparticles layer are spaced apart from each other, and a gap of two adjacent metal nanoparticles is in a range from 2 nm to 1 mm.

5. The magnetic pigment flake according to claim 1, wherein the metal nanoparticles layer is arranged on each of a front surface and a rear side of the filtering film layer, such that the magnetic pigment flake is arranged with a symmetrical structure centering on the filtering film layer.

6. The magnetic pigment flake according to claim 1, wherein the filtering film layer comprises a magnetic core layer, a first medium layer, and a second medium layer; the first medium layer is stacked on at least one of main surfaces of the magnetic core layer, the metal nanoparticles layer is arranged on a side of the first medium layer away from the magnetic core layer, the second medium layer is arranged between the first medium layer and the magnetic core layer, and a refraction index of the second medium layer is less than a refraction index of the first medium layer.

7. The magnetic pigment flake according to claim 6, wherein the magnetic core layer is a multi-layer composite structure, and the multi-layer composite structure comprises at least one of a M1M0M2 structure, a M0M1M0 structure, a M1D1M0D2M2 structure, a M0D1M1D2M0 structure, and a M1D1M0 structure, the M0 is a magnetic film layer, the M1 or M2 is a metal film layer, and the D1 or D2 is a dielectric film layer.

8. The magnetic pigment flake according to claim 7, wherein the refraction index of the second medium layer is less than or equal to 1.65;
the second medium layer is selected from at least one of silicon dioxide, aluminium oxide, magnesium fluoride, aluminum fluoride, cerium fluoride, lanthanum fluoride, neodymium fluoride, samarium fluoride, barium fluoride, calcium fluoride, lithium fluoride, polystyrene, polyethylene, polymethyl methacrylate, polyamide imide, polyperfluoroethylene propylene, tetrafluoroethylene, trifluorochloroethylene, cellulose propionate, cellulose acetate, cellulose acetate butyrate, methylpentene polymer, homoformaldehyde, acrylic resin, cellulose nitrate, ethyl cellulose, polypropylene, poly-sulfone, poly-ethersulfone, mica, heterogeneous isomorphic polymer, polybutene, ionic cross-linked polymer, acrylic copolymer, thermoplastic, styrene butadiene, polyvinyl chloride, urea formaldehyde, styrene acrylonitrile, and polycarbonate.

9. The magnetic pigment flake according to claim 7, wherein the filtering film layer further comprises an absorbing layer; the absorbing layer and the second medium layer are arranged between the magnetic core layer and the first medium layer; the absorbing layer is closer to the first medium layer than the second medium layer.

10. The magnetic pigment flake according to claim 9, wherein a thickness of the absorbing layer is less than 30 nm;
materials of the absorbing layer are selected from at least one of titanium, aluminum, chromium, nickel, palladium, titanium, vanadium, cobalt, iron, carbon, tin, tungsten, molybdenum, rhodium, and niobium, or selected from an alloy of at least one thereof, or selected from silicon carbide.

11. The magnetic pigment flake according to claim 7, wherein-the number of the magnetic core layer is at least two; the second medium layer is arranged between two adjacent magnetic core layers; the first medium layer is arranged on a main surface of the outermost magnetic core layer away from the second medium layer.

12. The magnetic pigment flake according to claim 11, wherein a physical thickness of the magnetic core layer is less than 30 nm;
the second medium layer is a dielectric stack with alternating high and low refractive index film layers, or a dielectric film layer;
materials of the second medium layer are selected from at least one of silicon dioxide, aluminium oxide, magnesium fluoride, aluminum fluoride, cerium fluoride, lanthanum fluoride, neodymium fluoride, samarium fluoride, barium fluoride, and calcium fluoride.

13. The magnetic pigment flake according to claim 7, wherein the filtering film layer further comprises a reflective layer; the number of the magnetic core layer is at least two; the second medium layer and the reflective layer are arranged between two adjacent magnetic core layers; the reflective layer is separated from each of the two adjacent magnetic core layers by the second medium layer; the first medium layer is arranged on a main surface of the outermost magnetic core layer away from the second medium layer.

14. The magnetic pigment flake according to claim 13, wherein materials of the reflective layer are selected from at least one of aluminum, silver, gold, copper, platinum, tin, titanium, palladium, rhodium, niobium, chromium, and alloys thereof;
a physical thickness of the reflective layer is in a range from 2 nm to 500 nm.

15. The magnetic pigment flake according to claim 7, wherein an interference cavity is formed by the magnetic core layer and the first medium layer.

16. The magnetic pigment flake according to claim 7, wherein the first medium layer is selected from at least one of lanthanum titanate, titanium pentoxide, niobium pentoxide, zinc sulfide, zinc oxide, zirconia, titanium dioxide, carbon, indium oxide, indium tin oxide, tantalum pentoxide, cerium oxide, yttrium oxide, europium oxide, iron oxide, ferroferric oxide, hafnium nitride, hafnium carbide, hafnium oxide, lanthanum oxide, magnesium oxide, neodymium oxide, praseodymium oxide, samarium oxide, antimony trioxide, silicon carbide, silicon nitride, silicon monoxide, selenium trioxide, tin oxide, and tungsten trioxide;
the magnetic core layer is made of at least one of iron, cobalt, nickel, gadolinium, terbium, dysprosium and erbium, oxides and alloys thereof.

17. An optically variable ink, comprising:
an ink body; and
magnetic pigment flakes, each of the magnetic pigment flakes comprising:
a filtering film layer, with a magnetic or magnetizable material; and
a metal nanoparticles layer, formed on a surface of the filtering film layer;
wherein each of metal nanoparticles layer has a light scatter-enhancing property with a wavelength selectivity for incident light, the each of the metal nanoparticles layers is configured to generate scattered light enhanced by a local surface plasmon resonance under an irradiation of visible light exceeding a predetermined intensity, and the filtering film layer has a Fabry Perot interference cavity; a color of the metal nanoparticles layer under the local surface plasmon resonance in response to the metal nanoparticles layer being irradiated by the visible light exceeding the predetermined intensity is different from a color of the metal nanoparticles layer under the local surface plasmon resonance in response to the metal nanoparticles layer being irradiated by the visible light below the predetermined intensity and
wherein the magnetic pigment flakes are doped in the ink body.

18. An anti-falsification article, comprising:
an article body; and
an optically variable ink, coated on the article body, and comprising an ink body and magnetic pigment flakes;
wherein each of the magnetic pigment flakes comprises:
a filtering film layer, with a magnetic or magnetizable material; and
a metal nanoparticles layer, formed on a surface of the filtering film layer;
wherein each of metal nanoparticles layer has a light scatter-enhancing property with a wavelength selectivity for incident light, the each of the metal nanoparticles layers is configured to generate scattered light enhanced by a local surface plasmon resonance under an irradiation of visible light exceeding a predetermined intensity, and the filtering film layer has a Fabry Perot interference cavity; a color of the metal nanoparticles layer under the local surface plasmon resonance in response to the metal nanoparticles layer being irradiated by the visible light exceeding the predetermined intensity is different from a color of the metal nanoparticles layer under the local surface plasmon resonance in response to the metal nanoparticles layer being irradiated by the visible light below the predetermined intensity and wherein the magnetic pigment flake of the optically variable ink is magnetically oriented, such that a bright and dark areas are generated with a viewing angel changing under an irradiation of visible light below the predetermined intensity; and under an irradiation of visible light exceeding the predetermined intensity, light with a color different from that of the bright area is generated on a corresponding position of the dark area.

19. The anti-falsification article according to claim 18, wherein the anti-falsification article is configured to generate scattered light enhanced by the local surface plasmon resonance under an irradiation of the light exceeding a predetermined intensity, such that a color generated by the dark area of the anti-falsification article under an irradiation of the light exceeding a predetermined intensity is different from a color generated by the dark area of the anti-falsification article under an irradiation of the light below the predetermined intensity.

* * * * *